US006911184B1

(12) United States Patent
Matsunaga et al.

(10) Patent No.: US 6,911,184 B1
(45) Date of Patent: Jun. 28, 2005

(54) EXHAUST EMISSION CONTROL SYSTEM AND METHOD FOR INTERNAL COMBUSTION ENGINES

(75) Inventors: Shinichi Matsunaga, Aichi (JP); Shuichi Kubo, Aichi (JP); Motohisa Saiki, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 416 days.

(21) Appl. No.: 10/110,223

(22) PCT Filed: Oct. 16, 2000

(86) PCT No.: PCT/JP00/07176

§ 371 (c)(1),
(2), (4) Date: Apr. 22, 2002

(87) PCT Pub. No.: WO01/29387

PCT Pub. Date: Apr. 26, 2001

(30) Foreign Application Priority Data

Oct. 21, 1999 (JP) ............................................ 11-299574

(51) Int. Cl.⁷ ........................... G05D 7/00; G05D 11/00; B01D 53/34; F01N 3/08; F01N 3/10

(52) U.S. Cl. ........................ 422/110; 422/108; 422/111; 422/168; 422/177; 422/180; 60/276; 60/285; 60/301; 60/302

(58) Field of Search ............................... 422/168, 177, 422/180, 105, 107, 108, 110, 111; 60/276, 285, 297, 301, 302

(56) References Cited

U.S. PATENT DOCUMENTS

| 5,412,945 A | 5/1995 | Katoh et al. .................. 60/285 |
| 5,473,887 A | * 12/1995 | Takeshima et al. ............ 60/276 |
| 5,575,983 A | 11/1996 | Suzuki et al. ............. 423/213.5 |
| 5,804,152 A | 9/1998 | Miyoshi et al. ........... 423/213.5 |
| 5,911,960 A | 6/1999 | Miyoshi et al. ........... 423/213.5 |
| 5,951,956 A | 9/1999 | Muaki et al. .............. 423/213.5 |

FOREIGN PATENT DOCUMENTS

| JP | 5-317652 | 12/1993 |
| JP | 10-249199 | 9/1998 |
| JP | 11-107741 | 4/1999 |
| JP | 11-107810 | 4/1999 |
| WO | 93/07363 | 4/1993 |

* cited by examiner

Primary Examiner—Alexa Doroshenk
(74) Attorney, Agent, or Firm—Oblon, Spivak, McClelland, Maier & Neustadt, P.C.

(57) ABSTRACT

An $NO_x$ storage-and-reduction type catalyst is used which exhibits a saturated $NO_x$ storage amount of 5 g or more as $NO_2$ with respect to 1 liter of a catalyst volume at 500° C., and rich spiking is controlled so that an actual $NO_x$ storage amount of the $NO_x$ storage-and-reduction type catalyst becomes 50% or less of the saturated $NO_x$ storage amount.

Since the saturated $NO_x$ storage amount is large, the $NO_x$ storage amount is large even when it is 50% or less, it is possible to prolong intervals of the rich spiking. Then, since $NO_x$ storage component stores $NO_x$ preferentially into the sites which are likely to store and release $NO_x$, a reduction efficiency is high. Therefore, while prolonging the intervals of the rich spiking and sustaining an effect of mileage improvement, it is possible to improve the reduction efficiency of $NO_x$.

10 Claims, 3 Drawing Sheets

Likely to be Eliminated ◄────► Less Likely to be Eliminated

Distribution of Storage Sites

EXHAUST EMISSION CONTROL SYSTEM AND METHOD FOR INTERNAL COMBUSTION ENGINES

TECHNICAL FIELD

The present invention relates to an exhaust gas purifying apparatus and exhaust gas purifying process for an internal combustion engine, and, in particular, to an exhaust gas purifying apparatus and exhaust gas purifying process which can efficiently reduce and purify $NO_x$ while inhibiting mileage from lowering.

BACKGROUND ART

Recently, the global warming phenomenon by carbon dioxide has become an issue, and to reduce the carbon dioxide emission amount has become an assignment. In automobile as well, to reduce the carbon dioxide amount in the exhaust gas has become an assignment, and a lean-burn engine which can thinly burn a fuel in an excessive oxygen atmosphere has been developed. By this lean-burn engine, since mileage is improved, it is possible to suppress the emission amount of carbon dioxide.

By the way, in a case where harmful components in an exhaust gas from a lean-burn engine are reduced, since the exhaust gas is put in an excessive oxygen atmosphere, reduction reactions become less likely to occur, and the reduction and purification of $NO_x$ become difficult. Hence, in Japanese Unexamined Patent Publication (KOKAI) No. 5-317,652, an $NO_x$ storage-and-reduction type catalyst is disclosed on which an $NO_x$ storage component, being selected from the group consisting of alkali metals, alkaline-earth metals and rare-earth elements, is loaded along with a noble metal. By using this $NO_x$ storage-and-reduction type catalyst and controlling an air-fuel ratio so that it becomes from a fuel-stoichiometric to rich atmosphere in a pulsating manner in the midway of a fuel-lean atmosphere, it is possible to efficiently progress the oxidation of HC and CO as well as the reduction of $NO_x$, and accordingly it is possible to acquire high purifying performance.

Namely, an exhaust gas which is burned in a fuel-lean atmosphere becomes a reduction components lean atmosphere, in the reduction components lean atmosphere, NO in the exhaust gas is oxidized to become $NO_x$ and is stored into the $NO_x$ storage component, and accordingly the emission of $NO_x$ is suppressed. Then, when it is controlled from a fuel-stoichiometric to rich air-fuel ratio in a pulsating manner, the exhaust gas becomes from a reduction components stoichiometric to rich atmosphere. Therefore, $NO_x$ are released from the $NO_x$ storage component, and they react with the reduction components, such as HC, which exist in the exhaust gas, so that they are reduced, and accordingly the emission of $NO_x$ is suppressed. Therefore, it is possible to suppress the emission of $NO_x$ in all of the atmospheres from fuel-rich to fuel-lean.

To control an air-fuel ratio in a pulsating manner so as to become from a fuel-stoichiometric to rich atmosphere is referred to as rich spiking, and the extent of making a fuel-rich atmosphere by the rich spiking is expressed by deep or shallow. Namely, by rich spiking, making a heavy degree of fuel-rich atmosphere is referred to as "charging rich spiking deeply," and making a light degree of fuel-stoichiometric to rich atmosphere is referred to as "charging rich spiking shallowly." Then, in Japanese Unexamined Patent Publication (KOKAI) No. 11-107,810, and the like, there is set forth to appropriately control the extent of the rich spiking and the timing of charging it.

Then, it has been required to purify $NO_x$, which are emitted from an engine being operated under a variety of fuel-lean conditions, by using an $NO_x$ storage-and-reduction type catalyst while always sustaining a purifying rate as high as 90% or more. However, in conventional $NO_x$ storage-and-reduction type catalysts, when the $NO_x$ amount, which is emitted from an engine in a unit period of time, is large, the rich spiking should be charged at intervals of from a couple of seconds to 60 seconds. However, in the excessive fuel component to be supplied as the rich spiking, there exists, in addition to an amount to be used in the reduction of $NO_x$, an amount to be used in controlling the combustion state of an engine to a fuel-rich air-fuel ratio. Therefore, in a case where the rich spiking is charged frequently, there arises the deterioration of mileage. In particular, in a case where being driven ordinarily at a high speed, the $NO_x$ amount, which is emitted from an engine, enlarges remarkably. Therefore, in order to sustain a high $NO_x$ purifying rate, the rich spiking should be kept being charged at very short intervals of 10 seconds or less, and accordingly there is a problem in that the mileage is lowered considerably.

The present invention has been done in view of such circumstances, and its main object is to improve mileage by prolonging the intervals of the rich spiking as well as to improve the reduction-and-purification efficiency of $NO_x$.

The characteristics of an exhaust gas purifying apparatus for an internal combustion engine, which solves the aforementioned assignments, lie in that it is used for an internal combustion engine, which can select an operation at a fuel-lean air-fuel ratio and an operation at a fuel-stoichiometric or rich air-fuel ratio and comprises: an $NO_x$ storage-and-reduction type catalyst disposed in an exhaust gas flow passage and exhibiting a saturated $NO_x$ storage amount of 5 g or more as $NO_2$ with respect to 1 liter of a catalyst volume at 500° C.; $NO_x$ storage amount estimating means for estimating an actual $NO_x$ storage amount of the $NO_x$ storage-and-reduction type catalyst; air-fuel ratio adjusting means for adjusting an exhaust gas atmosphere to reduction components lean or reduction components rich; and a controlling device for controlling the air-fuel ratio adjusting means based on an estimated value estimated by the $NO_x$ storage amount estimating means so that the actual $NO_x$ storage amount becomes 50% or less of the saturated $NO_x$ storage amount.

Moreover, the characteristics of an exhaust gas purifying process for an internal combustion engine of the present invention lie in that, in an exhaust gas purifying process for an internal combustion engine, in which an $NO_x$ storage-and-reduction type catalyst including an $NO_x$ storage component is contacted with an exhaust gas from an internal combustion engine, which can select an operation at a fuel-lean air-fuel ratio and an operation at a fuel-stoichiometric or rich air-fuel ratio, thereby storing $NO_x$ contained in the exhaust gas into the $NO_x$ storage component in a reduction components lean atmosphere, and reducing $NO_x$ released from the $NO_x$ storage component by making a reduction components stoichiometric to rich atmosphere by rich spiking, an $NO_x$ storage-and-reduction type catalyst exhibiting a saturated $NO_x$ storage amount of 5 g or more as $NO_2$ with respect to 1 liter of a catalyst volume at 500° C. is used, and in that the rich spiking is controlled so that an actual $NO_x$ storage amount of the $NO_x$ storage-and-reduction type catalyst becomes 50% or less of the saturated $NO_x$ storage amount.

The "fuel-lean air-fuel ratio" refers to an air-fuel ratio which makes an exhaust gas into an atmosphere in which oxygen exists in a concentration which exceeds an oxygen equivalent ratio required for oxidizing all of reduction components, such as CO, THC and $H_2$. In the case of an air-fuel ratio (A/F: ratio of air to fuel by weight), the equivalent (stoichiometric) point is around 14.6, and, in the present invention, an atmosphere whose A/F exceeds 14.6 is called a fuel-lean air-fuel ratio. Moreover, the "fuel-rich air-fuel ratio" refers, contrary to the "fuel-lean air-fuel ratio," to an air-fuel ratio which makes an exhaust gas into an atmosphere in which oxygen exists in a concentration which does not reach an oxygen equivalent ratio required for oxidizing all of the reduction components, an air-fuel ratio in which A/F does not reach 14.6 is called a fuel-rich air-fuel ratio.

BEST MODE FOR CARRYING OUT INVENTION

Figure 1:
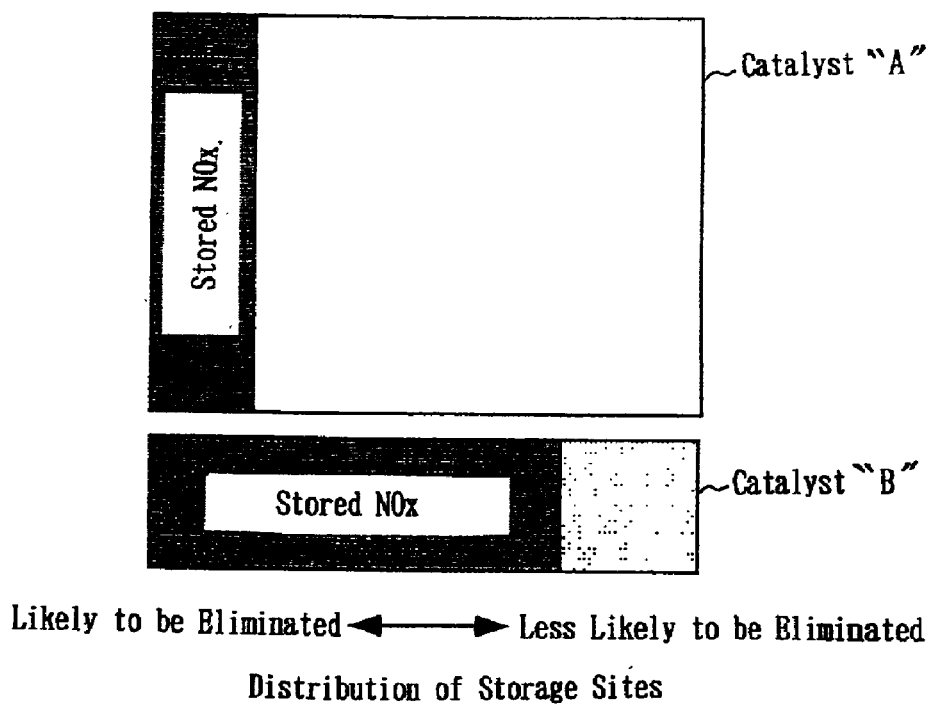
FIG. 1 is an explanatory diagram for illustrating the difference of $NO_x$ storage sites resulting from the difference of saturated $NO_x$ storage amounts.

The inventors of the present application earnestly studied first the relationships between the charging timing of the rich spiking as well as its depth and the $NO_x$ purifying performance by using an $NO_x$ storage-and-reduction type catalyst in order to solve the aforementioned assignments. Then, as a result, they found out that the reduction efficiency was high in a case where the rich spiking was charged in a stage before the $NO_x$ storage amount saturates, and discovered that the reduction efficiency, which resulted from the rich spiking, was the highest when the storage amount was 50% or less of the saturated $NO_x$ storage amount.

However, even if the rich spiking is charged when the storage amount is 50% or less of the saturated $NO_x$ storage amount, if the absolute amount of storable $NO_x$ is less, the purifying rate of $NO_x$ becomes low in a case where a large amount of $NO_x$ generates under the high-temperature fuel-lean condition, such as high-speed ordinary driving.

Hence, it was decided to use a catalyst which could store $NO_x$ in an amount equivalent to the saturated $NO_x$ storage amount of a conventional $NO_x$ storage-and-reduction type catalyst or more thereof even if it exhibited the storage amount of 50% or less of the saturated $NO_x$ storage amount. The present invention has been done by such discoveries and the selection of an optimum catalyst.

Note that the "saturated $NO_x$ storage amount" refers to a total $NO_x$ amount which is stored in a catalyst, after $NO_x$ stored in the catalyst is fully reduced, between the time of beginning the introduction of $NO_x$ into the catalyst and the time when the catalyst-outlet-gas $NO_x$ concentration reaches the catalyst-inlet-gas $NO_x$ concentration. In the present invention, this value is found by converting the $NO_x$ amount stored with respect to 1 liter of the catalyst into the $NO_2$ weight.

Namely, in the exhaust gas purifying apparatus and exhaust gas purifying process of the present invention, an $NO_x$ storage-and-reduction type catalyst whose saturated $NO_x$ storage amount is 5 g or more as $NO_2$ at 500° C. is used, and the rich spiking is controlled so that the actual $NO_x$ storage amount of the $NO_x$ storage-and-reduction type catalyst becomes 50% or less of the saturated $NO_x$ storage amount. Thus, even when the frequency of the rich spiking is made equal to conventional one or longer, it is possible to reduce most of the stored $NO_x$, and the reduction efficiency is improved greatly. Therefore, it is possible to satisfy both of the improvement of mileage and the improvement of $NO_x$ purifying rate.

Note that the upper limit value of the saturated $NO_x$ storage amount is defined by the amount of used $NO_x$ storage component, however, in a case where barium is used as an $NO_x$ storage component (2 mol as barium carbonate), 184 g with respect to 1 liter of the catalyst is the upper limit value. This is because, even when barium is loaded more than this, the effect saturates, and the activity lowers since the loaded noble metal is covered with barium.

As the $NO_x$ storage-and-reduction type catalyst whose saturated $NO_x$ storage amount is 5 g or more as $NO_2$ at 500° C., as set forth in Japanese Unexamined Patent Publication (KOKAI) No. 10-249,199, it is possible to use one which is composed of a support comprising a composite oxide expressed by $MgO$—$Al_2O_3$, which is prepared by a sol-gel method with a magnesium salt and an aluminum alkoxide as starting materials, and at least one $NO_x$ storage component as well as a noble metal, which are loaded on the support, the $NO_x$ storage component being selected from the group consisting of alkali metals, alkaline-earth metals and rare-earth elements.

Further, it is possible to use an $NO_x$ storage-and-reduction type catalyst which uses a support comprising alumina particles and a composite oxide layer having a structure which is formed on at least part of the surface of the alumina particles and which is expressed by a chemical formula, $MO$—$nAl_2O_3$ ("M" is at least one member selected from the group consisting of alkaline-earth metals and rare-earth elements.).

Furthermore, it is possible to use an $NO_x$ storage-and-reduction type catalyst which uses a support comprising a first composite oxide, expressed by $MgO$—$Al_2O_3$, and a second composite oxide, expressed by $TiO_2$—$ZrO_2$.

The composite oxide, such as $MgO$—$Al_2O_3$, is a spinel compound, since it exhibits a higher basicity than alumina does, the $NO_x$ storage ability in a high-temperature region improves. Therefore, when such a support is used, it is possible to make an $NO_x$ storage-and-reduction type catalyst which exhibits a saturated $NO_x$ storage amount of 5 g or more as $NO_2$ in the high-temperature region like 500° C.

Note that, when the saturated $NO_x$ storage amount is less than 5 g as $NO_2$ at 500° C., the intervals between the rich spiking should be shortened in order to keep using so as to be the $NO_x$ storage amount of 50% or less. In this case, since, among the excessive fuel components which are supplied as the rich spiking, the amount, which is used in order to control the combustion state of an engine to a fuel-rich air-fuel ratio, is increased so that the amount used for the reduction of $NO_x$ decreases, the effect of the mileage improvement is hardly revealed.

On the aforementioned support, an $NO_x$ storage component and a noble metal are loaded to form an $NO_x$ storage-and-reduction type catalyst. As the $NO_x$ storage component, an element is used which is selected from the group consisting of alkali metals, such as K, Na, Li and Cs, alkaline-earth metals, such as Ba, Ca, Sr and Mg, or rare-earth elements, such as La, Sc and Y. Moreover, as the noble metal, Pt, Rh, Pd, Ir, and the like, are exemplified. The loading amount of the $NO_x$ storage component can desirably fall in a range of from 0.4 to 2.0 mole in the total amount with respect to 1 liter of the support, and the loading amount of the noble metal can desirably fall in a range of from 2 to 20 g with respect to 1 liter of the support.

In the exhaust gas purifying process of the present invention, the aforementioned $NO_x$ storage-and-reduction type catalyst is contacted with an exhaust gas from an internal combustion engine, which can select an operation at a fuel-lean air-fuel ratio and an operation at a fuel-stoichiometric or rich air-fuel ratio. Since the exhaust gas, which is burned with a fuel-lean air-fuel ratio, is turned into a reduction components lean atmosphere, NO in the exhaust gas is oxidized on the catalyst to turn into $NO_x$, and is stored in the $NO_x$ storage component on the catalyst. Then, when the exhaust gas is turned into a reduction components rich atmosphere by charging the rich spiking, $NO_x$, which have been stored in the $NO_x$ storage component, are released, and are reduced by the reduction components, such as CO and HC, in the exhaust gas.

Then, in the present invention, the $NO_x$ storage-and-reduction type catalyst is used whose saturated $NO_x$ storage amount is 5 g or more as $NO_2$ at 500° C., and the rich spiking is controlled so that the actual $NO_x$ storage amount of the $NO_x$ storage-and-reduction type catalyst becomes 50% or less, more desirably 30% less, of the saturated $NO_x$ storage amount. Namely, the rich spiking is charged in a state that the actual $NO_x$ storage component is 2.5 g or less, more desirably 1.5 g or less. By thus charging the rich spiking in a state that does not satisfy the saturated $NO_x$ storage amount, the reduction efficiency of $NO_x$ is heightened extremely, and it is possible reduce and purify most of the stored $NO_x$.

The reason why it is thus effected is not clear, however, it is assumed as follows. Namely, it is believed that, in the $NO_x$ storage sites of a catalyst, a variety of sites exist from sites, which are less likely to store $NO_x$ and are less likely to release them, to sites, which store $NO_x$ with ease relatively and are likely to release them. Suppose that the distribution of sites is uniform, and let us consider a case where $NO_x$ are stored in an equal amount in a catalyst "A" having a greater saturated $NO_x$ storage ability and a catalyst "B" having a less saturated $NO_x$ storage ability, respectively.

In FIG. 1, the saturated $NO_x$ storage abilities correspond to the areas of the rectangles, the rectangle having a larger area illustrates the catalyst "A" having a greater saturated $NO_x$ storage ability, and the rectangle having a smaller area illustrates the catalyst "B" having a less saturated $NO_x$ storage ability. The hatched portions having the same area show the stored $NO_x$ amount. As illustrated in FIG. 1, in the catalyst "A," $NO_x$ are stored in sites which store $NO_x$ with ease and are likely to release them, but, in the catalyst "B," $NO_x$ are loaded on up to sites which are less likely store $NO_x$ and are less likely to release them. In such states, when the rich spiking is charged, it is believed that the reduction efficiency is high because $NO_x$ are readily released from the catalyst "A" and are reduced, and that, on the other hand, the reduction efficiency becomes low because $NO_x$ are less likely to release from the catalyst "B."

Moreover, since the saturated $NO_x$ storage amount of the $NO_x$ storage-and-reduction type catalyst is large in the present invention, even in a case where rich spiking is charged so that the $NO_x$ storage amount is 50% or less, or 30% or less, it is possible to make the intervals between the rich spiking equal to the conventional ones or longer. Therefore, it is possible to avoid the drawback of lowering mileage, from this sense as well, the timing of charging the rich spiking can preferably be carried out, although it depends on the saturated $NO_x$ storage amount, at the moment when the $NO_x$ storage amount is 50% or less, or 30% or less, or at the moment when it reaches an amount as adjacent as possible to 50%, or 30%.

The exhaust gas purifying apparatus of the present invention, which can securely carry out the aforementioned exhaust gas purifying process of the present invention, is constituted by an $NO_x$ storage-and-reduction type catalyst, $NO_x$ storage amount estimating means, air-fuel ratio adjusting means and a controlling device.

It is possible to use for the $NO_x$ storage-and-reduction type catalyst, which is the same one as used in the aforementioned exhaust gas purifying process of the present invention, and one, which exhibits a saturated $NO_x$ storage amount of 5 g or more as $NO_2$ with respect to 1 liter of a catalyst volume at 500° C., is used.

The $NO_x$ storage amount estimating means is means, which estimates an actual $NO_x$ storage amount of the $NO_x$ storage-and-reduction type catalyst. The $NO_x$ amount, which is stored and held by the $NO_x$ storage-and-reduction type catalyst, is an $NO_x$ amount, which is stored in the $NO_x$ storage-and-reduction type catalyst in a unit period of time, and is proportional to an $NO_x$ amount, which is generated at an engine in a unit period of time. While, an $NO_x$ amount, which is generated at an engine in a unit period time, is decided by a fuel supply amount to an engine, an air-fuel ratio, an exhaust flow rate, and the like, and accordingly, when the running conditions of an engine are determined, it is possible to know an $NO_x$ amount, which is stored in the $NO_x$ storage-and-reduction type catalyst. Moreover, the estimation of actual $NO_x$ storage amount can be carried out by calculating from the fluctuating circumstances in the number of engine revolutions or the temperatures of exhaust gases, or it is possible to carry it out by measuring the $NO_x$ amounts in catalyst-inlet gases.

The air-fuel ratio adjusting means is means, which adjusts an exhaust gas atmosphere to reduction components lean or reduction components rich by adjusting an air-fuel ratio to fuel lean or fuel rich, and varies the atmospheres of exhaust gases by varying a fuel injection timing, a suction air amount, an inlet air pressure, a fuel supply amount, and the like.

The control device is a device, which controls, based on an estimated value estimated by the $NO_x$ storage amount estimating means, the air-fuel ratio adjusting means so that the actual $NO_x$ storage amount becomes 50% or less of the saturated $NO_x$ storage amount, and a computer is used for it.

To control the rich spiking so that it is charged when the $NO_x$ storage amount is 50% or less, or 30% or less, or at the moment when it reaches an amount as adjacent as possible to 50%, or 30%, it is possible to carry it out by estimating an accumulated $NO_x$ amount, which has been stored in the $NO_x$ storage-and-reduction type catalyst while the engine is running at a fuel-lean air-fuel ratio, with the $NO_x$ storage amount estimating means, and, when the accumulated $NO_x$ amount shows a designated value being 50% or less, or 30% less, of a saturated $NO_x$ amount for an $NO_x$ storage-andreduction type catalyst, which has been known in advance, by controlling the fuel injection timing, the suction air amount and the fuel injection amount with the air-fuel ratio adjusting means so as to switch from the fuel-lean air-fuel ratio to a fuel-rich air-fuel ratio in a short period of time.

Namely, in accordance with the exhaust gas purifying process of the present invention, it is possible to efficiently reduce and purify $NO_x$ while inhibiting the mileage from lowering by prolonging the intervals between the rich spiking. Moreover, in accordance with the exhaust gas purifying apparatus of the present invention, it is possible to securely carry out the exhaust gas purifying process of the present invention.

EXAMPLES

Hereinafter, the present invention will be described in detail with reference to examples and a comparative example.

(Example No. 1)

38 parts by weight of magnesium acetate tetrahydrate, 72 parts by weight of aluminum isopropoxide ($Al[OCH(CH_3)_2]_3$) and 400 parts by weight of isopropyl alcohol were mixed (Mg:Al=1:2 by molar ratio), and were refluxed at 80° C. for about 2 hours while stirring them. 60 parts by weight of ion-exchange water was dropped thereto to complete hydrolysis, were further kept being refluxed at 80° C. for 2 hours, and were thereafter cooled.

Subsequently, the solvents were removed on a water bath by using a rotary evaporator, were further dried naturally at room temperature for 24 hours, and were thereafter calcined in air at 850° C. for 5 hours, thereby obtaining a composite oxide support powder having a composition of $MgO$—$Al_2O_3$.

This support powder was made into a slurry, and, by using an alumina sol as a binder, a coating layer was formed on a honeycomb substrate (diameter: 103 mm and length: 150 mm), which was made from cordierite, by an ordinary method. The coating layer was formed in an amount of 240 g with respect to 1 liter of the honeycomb substrate.

Subsequently, into the honeycomb substrate with the coating layer, a diammine dinitro platinum (II) solution, which had a predetermined concentration, was impregnated in a predetermined amount, was evaporated and dried to solidify, and was thereafter calcined in air at 300° C. for 3 hours to load Pt. The loading amount of Pt was 10 g with respect to 1 liter of the honeycomb substrate.

Subsequently, into the honeycomb substrate with Pt loaded, a potassium acetate aqueous solution, which had a predetermined concentration, was impregnated in a predetermined amount, was evaporated and dried to solidify, and was thereafter calcined in air at 300° C. for 3 hours to load K. The loading amount of K was 0.0.6 mol with respect to 1 liter of the honeycomb substrate.

A saturated $NO_x$ storage amount of the resulting $NO_x$ storage-and-reduction type catalyst of Example No. 1 was 17 g as $NO_2$ at 500° C.

This $NO_x$ storage-and-reduction type catalyst of Example No. 1 was installed in an exhaust system of an in-line 4-cylinder 2-L direct-injection engine, and $NO_x$ purifying rates were measured under the evaluation conditions of the number of engine revolutions: 2,000 rpm, torque: 60 Nm, and catalyst-inlet temperature: 500° C. in the following manner.

The $NO_x$ storage-and-reduction type catalyst was used which was reduced completely by exposing it to an atmosphere, which was after setting the A/F of the engine, running under the aforementioned conditions, to 12, for 10 minutes. Then, the engine was operated under a fuel-lean atmosphere of A/F=20 under the aforementioned conditions, and the rich spiking of A/F=12 was charged every 5 minutes for 2 seconds. In this instance, the $NO_x$ purifying rates and $NO_x$ storage amounts after 1 minute from the charging of the rich spiking were measured. Then, the ratios of the actual $NO_x$ storage amounts with respect to the saturated $NO_x$ storage amounts were measured, and the relationship between the values and $NO_x$ purifying ratios is illustrated in FIG. 2.

Figure 2:
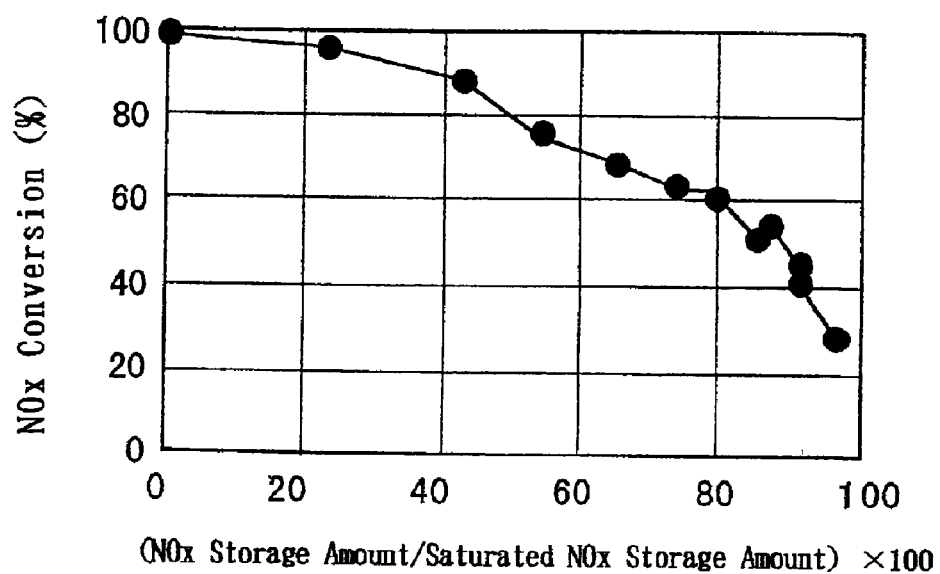
FIG. 2 is a graph for illustrating the relationship between proportions of actual $NO_x$ storage amounts with respect to saturated $NO_x$ storage amounts and $NO_x$ purifying rates in an $NO_x$ storage-and-reduction type catalyst which was used in Example No. 1.

From FIG. 2, it is seen that, in a case where the proportion of the actual $NO_x$ storage amount with respect to the saturated $NO_x$ storage amount was 50% or less, the $NO_x$ purifying ratio become 80% or more, and that, in a case where the proportion of the actual $NO_x$ storage amount with respect to the saturated $NO_x$ storage amount was 30% or less, the $NO_x$ purifying ratio become 90% or more. Namely, when an $NO_x$ storage-and-reduction type catalyst of 5 g/L is used, it is not necessary to charge the rich spiking until $NO_x$ were stored in an amount of 30% thereof, i.e., up to 1.5 g/L. Thus, it is possible to make the sufficient $NO_x$ purification and the mileage improvement compatible.

(Comparative Catalyst)

120 g of an $Al_2O_3$ powder, 120 g of a $TiO_2$ powder, 50 g of a $ZrO_2$ powder and 20 g of a $CeO_2$—$ZrO$, powder were mixed, were made into a slurry, and, by using an alumina sol as a binder, a coating layer was formed on a honeycomb substrate (diameter: 103 mm and length: 150 mm), which was made from cordierite, by an ordinary method. The coating layer was formed in an amount of 270 g with respect to 1 liter of the honeycomb substrate.

Subsequently, into the honeycomb substrate, a barium acetate aqueous solution, which had a predetermined concentration, was impregnated in a predetermined amount, was evaporated and dried to solidify, and was thereafter calcined in air at 300° C. for 3 hours to load Ba. Thereafter, it was immersed into a solution, which included ammonium carbonate in an amount as much as 3 times of Ba, for 1 hour to turn Ba into carbonate, and it was calcined at 300° C. for 3 hours.

Subsequently, into the honeycomb substrate having the coating layer with Ba loaded, a diammine dinitro platinum (II) solution, which had a predetermined concentration, was impregnated in a predetermined amount, was evaporated and dried to solidify, and was thereafter calcined in air at 300° C. for 3 hours to load Pt. Subsequently, a rhodium nitrate aqueous solution, which had a predetermined concentration, was impregnated in a predetermined amount, was evaporated and dried to solidify, and was thereafter calcined in air at 300° C. for 3 hours to load Rh. The loading amounts of Pt and Rh were 2.0 g for Pt and 0.5 g for Rh with respect to 1 liter of the honeycomb substrate. Subsequently, a potassium acetate aqueous solution, which had a predetermined concentration, was impregnated in a predetermined amount, was evaporated and dried to solidify, and was thereafter calcined in air at 300° C. for 3 hours to load K. The loading amounts of Ba and K were 0.2 mol for Ba and 0.1 mol for K with respect to 1 liter of the honeycomb substrate.

A saturated $NO_x$ storage amount of the resulting $NO_x$ storage-and-reduction type catalyst was 2 g as $NO_2$ at 500° C. This $NO_x$ storage-and-reduction type catalyst was considered a comparative catalyst.

The catalysts of Example No. 1 and the aforementioned comparative example were installed, respectively, in an exhaust system of an in-line 4-cylinder 2-L direct-injection engine, and $NO_x$ conversions were measured under the evaluation conditions of the number of engine revolutions: 2,000 rpm, torque: 60 Nm, and catalyst-inlet temperature: 500° C. in the following manner.

Figure 3:
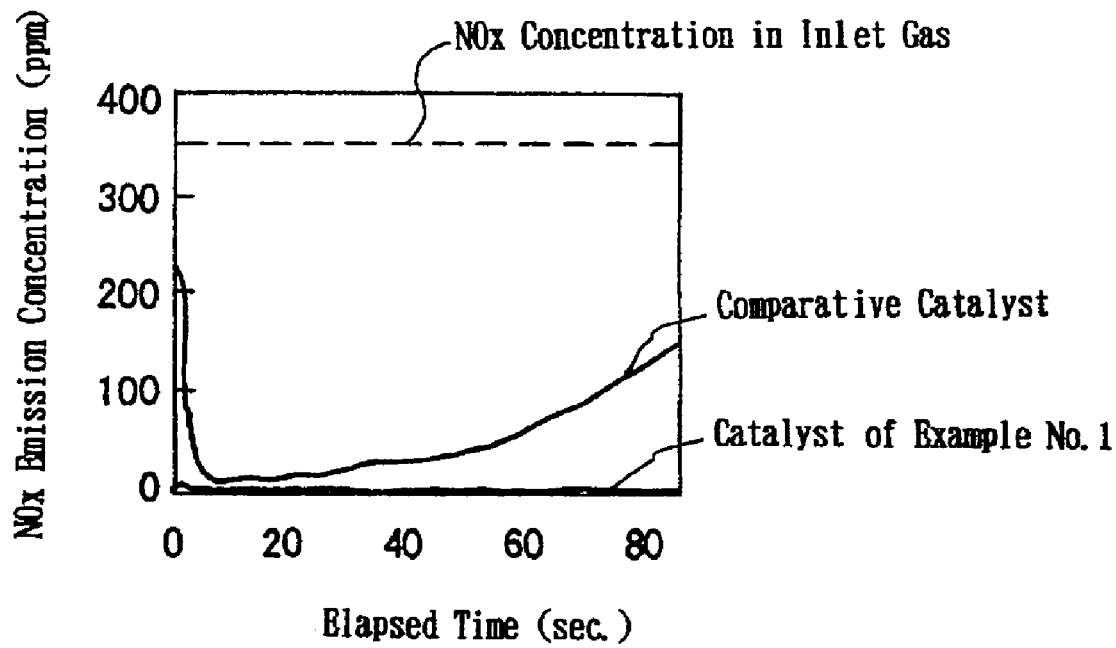
FIG. 3 is a graph for illustrating the relationships between elapsing times of rich spiking and concentrations of emitted $NO_x$.

The catalyst of Example No. 1 and the aforementioned comparative catalyst were used which were reduced completely by treating them in a hydrogen gas flow at 500° C. for 3 hours. Then, the engine was operated under a fuel-lean atmosphere of A/F=20 under the aforementioned conditions, and the rich spiking of A/F=12 was charged for 1 second. The charging intervals of the rich spiking were put at 4 levels, 30, 60, 90 and 120 seconds, and the $NO_x$ conversions were measured in the initial rich-spiking-charging section at 10 minutes after starting the operation. The results are set forth in Table 1.

subsequently, in a case where the charging of the rich spiking was carried out at intervals of 90 seconds, the elapsed times of fuel-rich atmosphere and the $NO_x$ concentrations in the outlet gases at the elapsed times were measured, respectively, and the results are illustrated in FIG. 3. In FIG. 3, the $NO_x$ concentration in the inlet gases is illustrated as well.

TABLE 1

| Rich-Spiking Interval | $NO_x$ Conversion (%) | |
|---|---|---|
| | Catalyst of Ex. No. 1 | Comparative Catalyst |
| 30 sec. | 99.8 | 95.3 |
| 60 sec. | 99.5 | 91.3 |
| 90 sec. | 99.0 | 82.2 |
| 120 sec. | 92.5 | 66.8 |

From Table 1, in the case of the $NO_x$ storage-and-reduction type catalyst of Example No. 1, it is seen that the high $NO_x$ conversions of 90% or more were exhibited under all of the conditions. However, in the case of the comparative catalyst, when the rich spiking was charged at intervals of up to 60 seconds, the $NO_x$ conversions of 90% or more were exhibited, but, when the intervals become longer than that, the $NO_x$ conversions were lowered.

Namely, in accordance with the $NO_x$ storage-and-reduction type catalyst of Example No. 1, even if the intervals of the rich spiking were long, a high $NO_x$ reduction efficiency was exhibited, and it is believed that this resulted from the fact that the saturated $NO_x$ storage amount was as high as 17 g.

Moreover, from FIG. 3, it is apparent that, in the comparative catalyst, although the $NO_x$ emission concentration was lowered sharply after the rich spiking, the $NO_x$ emission concentration was increased so that the $NO_x$ reduction efficiency was lowered, on the other hand, in the $NO_x$ storage-and-reduction type catalyst of Example No. 1, the emission of $NO_x$ was substantially zero during the rich spiking so that the reduction efficiency was remarkably high.

(Example No. 2)

Figure 4:
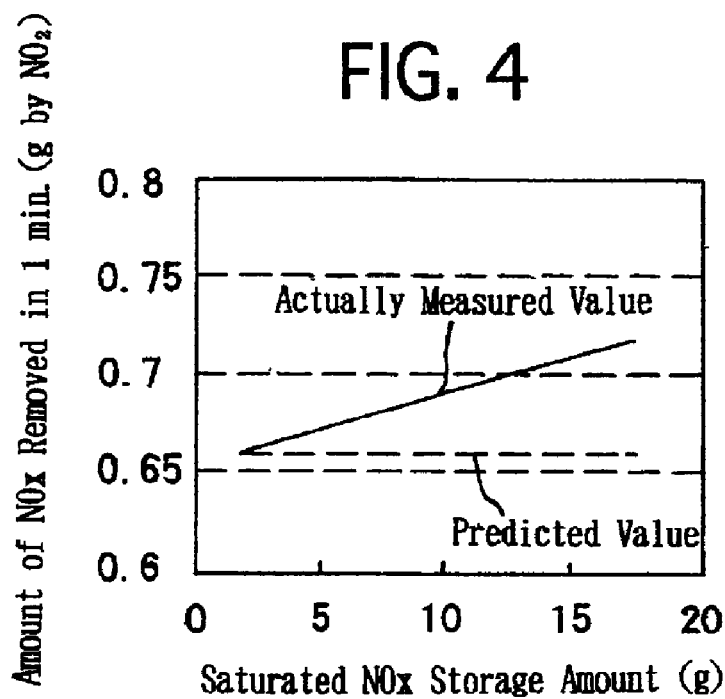
FIG. 4 is a graph for illustrating the relationships between saturated $NO_x$ storage amounts and $NO_x$ amounts which were reduced and removed.

Note that a variety of $NO_x$ storage-and-reduction type catalysts, whose saturated $NO_x$ storage amounts were different, were prepared in the same manner as Example No. 1, and the $NO_x$ purifying amounts at 1 minute from the charging of the rich spiking were measured in the same manner as Example No. 1. The results are illustrated in FIG. 4. The $NO_x$ purifying amounts are expressed by weights which are converted into $NO_2$.

Conventionally, since it has been considered that the saturated $NO_x$ storage amount and the reduction efficiency are unrelated, if such is the case, the 1-minute $NO_x$ purifying amount should be constant, as illustrated by the hatched line of FIG. 4, regardless of the saturated $NO_x$ storage amount. However, as a result of the aforementioned test, it has been evident that, as illustrated by the solid line of FIG. 4, the 1-minute $NO_x$ purifying amount is enlarged as the saturated $NO_x$ storage amount is increased.

(Example No. 3)

Figure 5:
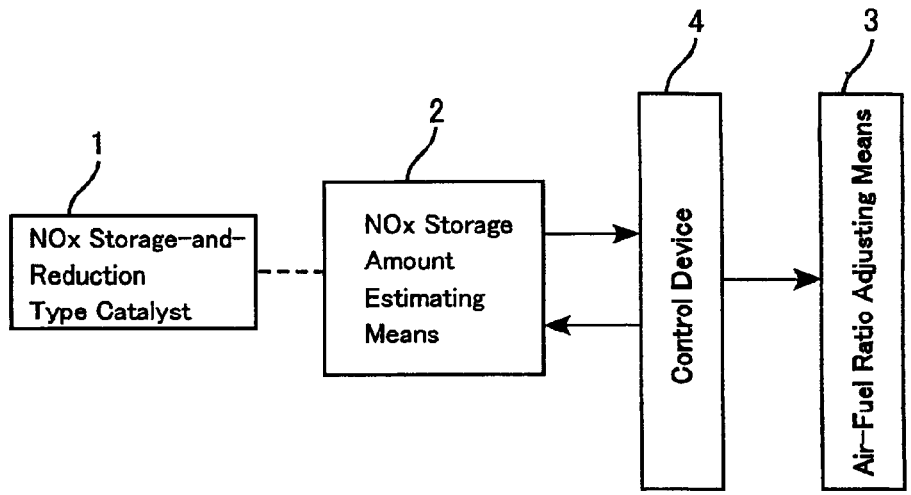
FIG. 5 is a block diagram of an exhaust gas purifying apparatus of an example of the present invention.

In FIG. 5, a construction of an exhaust gas purifying apparatus of this example is illustrated. This exhaust gas purifying apparatus is constituted by an $NO_x$ storage-and-reduction type catalyst 1, which is disposed in an exhaust gas flow passage from an automobile internal combustion engine and which exhibits a saturated $NO_x$ storage amount of 5 g or more as $NO_2$ with respect to 1 liter of a catalyst volume at 500° C., $NO_x$ storage amount estimating means 2 for estimating an actual $NO_x$ storage amount of the $NO_x$ storage-and-reduction type catalyst 1, air-fuel ratio adjusting means 3 for adjusting an exhaust gas atmosphere to reduction components lean or reduction components rich by controlling an air-fuel ratio to fuel lean or fuel rich, and a controlling device 4 for controlling the air-fuel ratio adjusting means 3 based on an estimated value estimated by the $NO_x$ storage amount estimating means 2 so that the actual $NO_x$ storage amount becomes 50% or less of the saturated $NO_x$ storage amount.

The $NO_x$ storage amount estimating means 2 and controlling device 4 are constituted by a computer (ECU). Moreover, on cases where the engine operation conditions (the accelerator opening extent, the number of engine revolutions, the suction air amount, the inlet pressure, the air-fuel ratio, the fuel supply amount, and the like) are varied, the amounts of $NO_x$, which are generated from the engine in a unit period of time, are measured actually, respectively. Then, in a RON of the ECU, the amounts of $NO_x$, which are stored in the $NO_x$ storage-and-reduction type catalyst 1 in a unit period of time, are saved as a form of a numerical map in which the engine loads (fuel injection amounts) and the number of engine revolutions are used.

Moreover, the air-fuel ratio adjusting means 3 is mainly composed of a fuel injection device, and varies the exhaust gas atmosphere by varying the fuel injection timing, the suction air amount, the inlet pressure, the fuel supply amount, and so on, with the control device 4.

Figure 6:
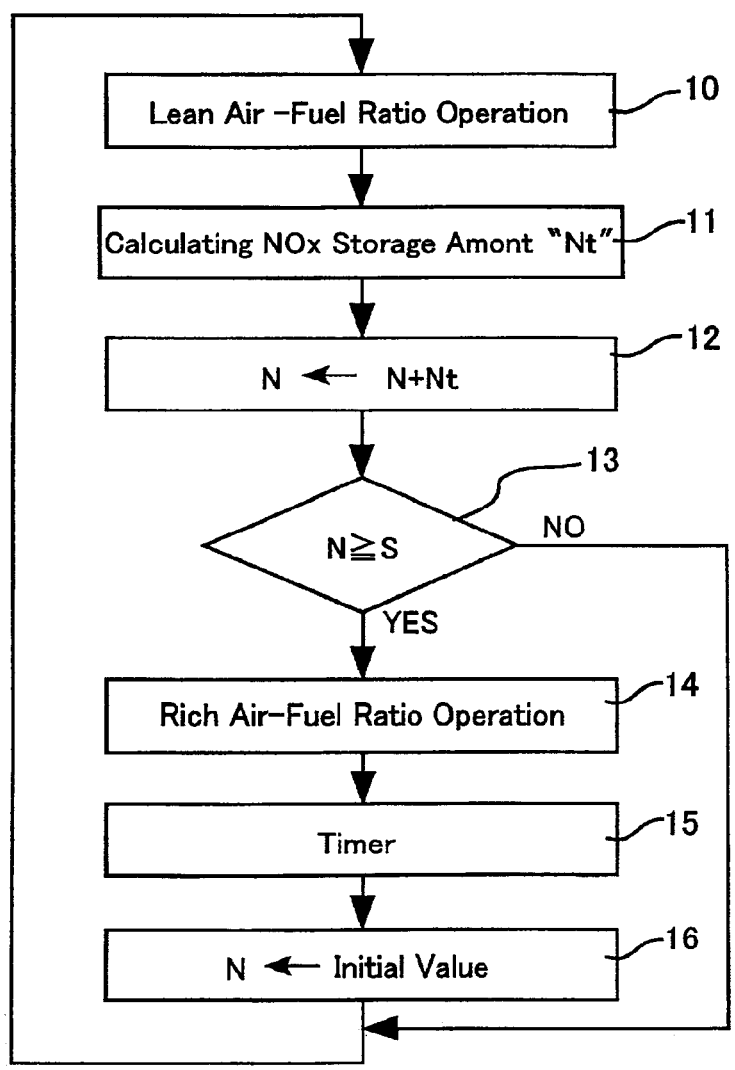
FIG. 6 is a flow chart for illustrating the processing contents in an exhaust gas purifying apparatus of an example of the present invention.

Hereinafter, the operation of the exhaust gas purifying apparatus of this example will be described with reference to the flow chart illustrated in FIG. 6.

First, at step 10, the engine is operated with a fuel-lean air-fuel ratio. At step 11, the ECU calculates at every predetermined time an $NO_x$ amount (Nt), which is stored in the $NO_x$ storage-and-reduction type catalyst 1 in a unit period of time, from the engine load (fuel injection amount) and the number of engine revolutions by using the map in the ROM. Then, at step 12, an $NO_x$ counter "N" is increased by this $NO_x$ storage amount "Nt." Thus, a value of the $NO_x$ counter "N" comes to always specify an amount of $NO_x$ which are stored in the $NO_x$ storage-and-reduction type catalyst 1.

Then, the ECU does not do anything, at step 13, in a case where the value of the aforementioned $NO_x$ counter "N" does not exceed a set value "S," which has been set in advance, and accordingly the fuel-lean air-fuel ratio operation is maintained. Then, at step 13, in a case where the value of the aforementioned $NO_x$ counter "N" is increased to the set value "S," which has been set in advance, or more, at step 14, the air-fuel ratio adjusting means 3 is controlled to switch to a fuel-rich air-fuel ratio operation so that the exhaust gas atmosphere of the engine is varied to reduction components rich. This rich spiking is carried out only for a predetermined short period of time by a timer at step 15. Thus, since a reduction components-rich exhaust gas is flowed into the $NO_x$ storage-and-reduction type catalyst 1, $NO_x$, which have been stored in the $NO_x$ storage-and-reduction type catalyst 1, are released so that they are reduced and purified.

Then, after the rich spiking is completed for the predetermined time, the counter "N" is reset to an initial value at step 16, and the operation returns back again to step 10 so that the air-fuel ratio adjusting means 3 is controlled to switch to a fuel-lean air-fuel ratio operation.

Therefore, it is possible to securely carry out the exhaust gas purifying process of the present invention by using the exhaust gas purifying apparatus of this example, by using such a catalyst, used in Example No. 1, etc., that exhibits a saturated $NO_x$ storage amount of 5 g or more as $NO_2$ with respect to 1 liter of a catalyst volume at 500° C., and by setting the set value "S" to a value of 50% or less, or 30% or less, of the saturated $NO_x$ storage amount.

What is claimed is:

1. An exhaust gas purifying apparatus used for an internal combustion engine, which can select an operation at a fuel-lean air-fuel ratio and an operation at a fuel-stoichiometric or rich air-fuel ratio, and which apparatus comprises:

an $NO_x$ storage-and-reduction type catalyst disposed in an exhaust gas flow passage and exhibiting a saturated $NO_x$ storage amount of 5 g or more as $NO_2$ with respect to 1 liter of a catalyst volume at 500° C.;

$NO_x$ storage amount estimating means for estimating an actual $NO_x$ storage amount of the $NO_x$ storage-and-reduction type catalyst;

air-fuel ratio adjusting means for adjusting an exhaust gas atmosphere to reduction components lean or reduction components rich; and a controlling device for controlling the air-fuel ratio adjusting means based on an estimated value estimated by the $NO_x$ storage amount estimating means so that the actual $NO_x$ storage amount becomes 50% or less of the saturated $NO_x$ storage amount.

2. The exhaust gas purifying apparatus, set forth in claim 1, characterized in that said controlling device controls said air-fuel ratio adjusting means so that the actual $NO_x$ storage amount becomes 30% or less of the saturated $NO_x$ storage amount of said $NO_x$ storage-and-reduction type catalyst.

3. The exhaust gas purifying apparatus, set forth in claim 1, characterized in that said $NO_x$ storage-and-reduction type catalyst comprises a support comprised of an $MgO$—$Al_2O_3$ composite oxide.

4. In an exhaust gas purifying process for an internal combustion engine, in which an $NO_x$ storage-and-reduction type catalyst including an $NO_x$ storage component is contacted with an exhaust gas from an internal combustion engine, which can select an operation at a fuel-lean air-fuel ratio and an operation at a fuel-stoichiometric or rich air-fuel ratio, thereby storing $NO_x$ contained in the exhaust gas into the $NO_x$ storage component in a reduction components lean atmosphere, and reducing $NO_x$ released from the $NO_x$ storage component by making a reduction components stoichiometric to rich atmosphere by rich spiking, the exhaust gas purifying process characterized in that:

an $NO_x$ storage-and-reduction type catalyst exhibiting a saturated $NO_x$ storage amount of 5 g or more as $NO_2$ with respect to 1 liter of a catalyst volume at 500° C. is used, and the rich spiking is controlled so that an actual $NO_x$ storage amount of the $NO_x$ storage-and-reduction type catalyst becomes 50% or less of the saturated $NO_x$ storage amount.

5. The exhaust gas purifying process, set forth in claim 4, characterized in that the rich spiking is controlled so that the actual $NO_x$ storage amount of said $NO_x$ storage-and-reduction type catalyst becomes 30% or less of the saturated $NO_x$ storage.

6. The exhaust gas purifying process, set forth in claim 4, characterized in that said $NO_x$ storage-and-reduction type catalyst comprises a support comprised of an $MgO$—$Al_2O_3$ composite oxide.

7. The exhaust gas purifying process, set forth in claim 4, characterized in that the $NO_x$ storage-and-reduction type catalyst exhibits a saturated $NO_x$ storage amount of 10 g or more as $NO_2$ with respect to 1 liter of a catalyst volume at 500° C.

8. The exhaust gas purifying process, set forth in claim 7, characterized in that the rich spiking is controlled so that the actual $NO_x$ storage amount of said $NO_x$ storage-and-reduction type catalyst becomes 30% or less of the saturated $NO_x$ storage amount.

9. The exhaust gas purifying process, set forth in claim 4, characterized in that the $NO_x$ storage-and-reduction type catalyst exhibits a saturated $NO_x$ storage amount of 15 g or more as $NO_2$ with respect to 1 liter of a catalyst volume at 500° C.

10. The exhaust gas purifying process, set forth in claim 9, characterized in that the rich spiking is controlled so that the actual $NO_x$ storage amount of said $NO_x$ storage-and-reduction type catalyst becomes 30% or less of the saturated $NO_x$ storage amount.

* * * * *